(12) United States Patent
Arneson et al.

(10) Patent No.: US 7,634,414 B2
(45) Date of Patent: Dec. 15, 2009

(54) AUTOMATED PACKAGE INFORMATION AND CONFIGURATION COMMUNICATION PROCESS

(75) Inventors: Kirk Arneson, Houston, TX (US); Jacob Anderson, Houston, TX (US)

(73) Assignee: General Electric Company, Schenectady, NY (US)

( * ) Notice: Subject to any disclaimer, the term of this patent is extended or adjusted under 35 U.S.C. 154(b) by 1868 days.

(21) Appl. No.: 10/155,996

(22) Filed: May 29, 2002

(65) Prior Publication Data

US 2003/0225710 A1    Dec. 4, 2003

(51) Int. Cl.
    *G06Q 99/00*    (2006.01)
(52) U.S. Cl. .......................................... 705/1
(58) Field of Classification Search ............. 705/1
    See application file for complete search history.

(56) References Cited

U.S. PATENT DOCUMENTS

| | | | | |
|---|---|---|---|---|
| 4,992,940 A * | 2/1991 | Dworkin | ........................ | 705/26 |
| 5,117,354 A * | 5/1992 | Long et al. | ..................... | 705/27 |
| 5,230,075 A | 7/1993 | Premerlani et al. | | |
| 5,493,490 A * | 2/1996 | Johnson | ........................ | 705/26 |
| 5,570,291 A * | 10/1996 | Dudle et al. | .................. | 700/95 |
| 5,615,342 A * | 3/1997 | Johnson | ........................ | 705/27 |
| 5,806,046 A * | 9/1998 | Curran et al. | ................... | 705/27 |
| 5,819,291 A | 10/1998 | Haimowitz et al. | | |
| 5,826,252 A | 10/1998 | Wolters, Jr. et al. | | |
| 5,960,430 A | 9/1999 | Haimowitz et al. | | |
| 6,356,909 B1 * | 3/2002 | Spencer | ........................ | 707/10 |
| 6,415,395 B1 | 7/2002 | Varma et al. | | |
| 6,438,484 B1 | 8/2002 | Andrew et al. | | |
| 6,442,569 B1 | 8/2002 | Crapo et al. | | |
| 6,609,108 B1 * | 8/2003 | Pulliam et al. | ................. | 705/27 |
| 6,925,196 B2 * | 8/2005 | Kass et al. | ................... | 382/111 |
| 2001/0001851 A1 * | 5/2001 | Piety et al. | ................... | 702/184 |
| 2002/0035507 A1 * | 3/2002 | Singh | ........................... | 705/14 |
| 2003/0004746 A1 * | 1/2003 | Kheirolomoom et al. | ...... | 705/1 |
| 2003/0036925 A1 * | 2/2003 | Miller | ........................... | 705/2 |

* cited by examiner

*Primary Examiner*—Jonathan Ouellette
(74) *Attorney, Agent, or Firm*—Nixon & Vanderhye P.C.

(57) ABSTRACT

A system and method for processing project data enables a user to identify an engine model based on specific customer specifications. Package options based on the identified engine model are stored in the system, and a user is able to select desired package options from the stored package options. Selected reports can be generated based on the selected package options. In this manner, product and project information can be communicated upstream to sales and/or the customer, project specific information can be communicated downstream to project execution, the business process can be directed and automated, and historical data on all projects and revisions can be maintained.

8 Claims, 9 Drawing Sheets

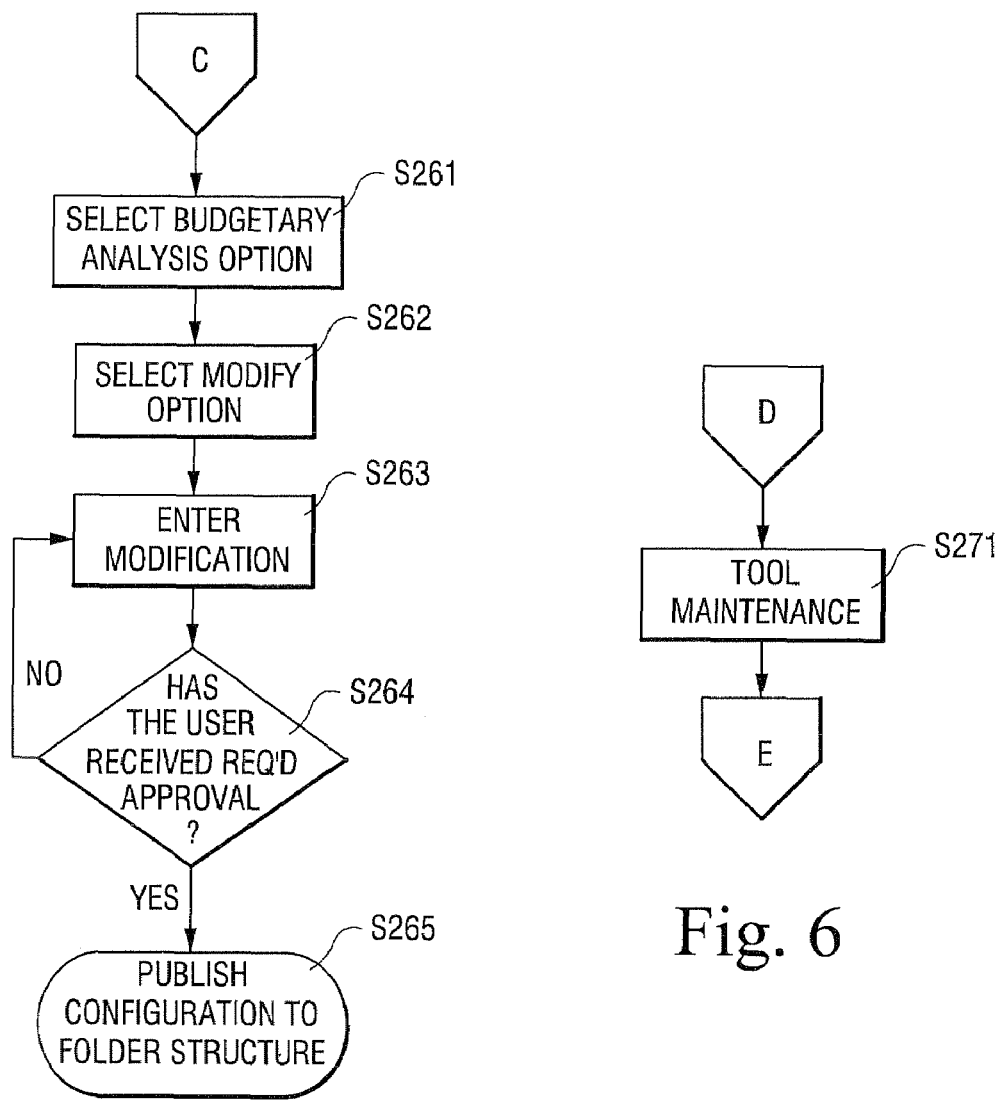

| Package Arrangement | _ 回 X |
|---|---|
| File  Administration  Documentation  View  Help | |

| Project Information | Documentation | Miscellaneous | Labor | Testing | Shipping | SOS Info. | SOS Line Items | Project Team | _ 回 X |

Prepared By [Kirk AMeson]
On the Date of [1/22/2002]
HOM Date [TBD]
Project Name [ ]
Sales Order Number [TBD]
CMS Number (Format xx-xxx-xxxxx) [ ]
Artemus Number [ ]
Contract With [TBD]
End User [TBD]
Contract Specification Attached [TBD ▷]
GEAEP Comments And Exclusions Attached [TBD ▷]
Number of Packages [1]
Duty [TBD ▷]
Application [TBD ▷]
Attended Operation [TBD ▷]
Site Location [TBD]
Elevation (ft.) [TBD]
Ambient Temperature (min/max F) [TBD]
Relative Humidity (min/max %) [TBD]
Facility Building [TBD ▷]

☐ Note

[Finish]
[Cancel]

AUTOMATED PACKAGE INFORMATION AND CONFIGURATION COMMUNICATION PROCESS

BACKGROUND OF THE INVENTION

The present invention relates to a database structure and method of processing project data and, more particularly, to an automated package information and configuration communication process for communicating product information upstream to a sales department or the like and a customer, project specific information downstream to project execution, direct and automate a business process, and maintain historical data on all projects and revisions.

FIG. 1 is a schematic illustration of a business process flow. Generally, in an inquiry to order (ITO) process, a sales team first interfaces with a customer, followed by a request for quote (RFQ) being submitted to the sales support group. Sales support would then break the RFQ into commercial and technical issues, and the technical issues (including a customer specification) would be submitted to the product management group.

The product management group would then review the customer specification and create two documents: (1) a production data sheet (PDS) presenting the scope of supply, and (2) a budget that identifies the cost to manufacture the defined scope based on the customer request. Both documents have generally been configured using known spreadsheet computer programs. These spreadsheets are then submitted to sales support via an iterative process until the scope of the project is well defined and accurate. A proposal would then be generated by sales support and submitted to the customer for review.

Assuming the company wins the bid, an agreement in principle (AIP) or contract will be signed and submitted along with a sales order summary (SOS) document that is also based on the project scope, to product management group for final review and the hand-over meeting (HOM) to OTR. The HOM consists of the project team meeting and reviewing the numerous documents (including the PDS, budget, SOS and an open items document among others) to verify that the project scope is accurate, attainable and consistent from document to document. A final revision is made to the documentation, and the resulting information is submitted to project management for execution.

Project management then meets directly with the customer to begin addressing the open items, revising PDS and SOS documents, and releasing the information to engineering. Engineering would then review the official documents and create a features and options document detailing what drawings are required to manufacture and assemble the package.

In addition to the multiple points of data entry, excessive numbers of documents presenting information based on a single scope of supply are required, multiple document translations and hours of unnecessary work are also required, and there exist no running budget, open item metrics, project metrics, business impact measurements or budgetary analysis capabilities within the current process.

Package configuration and information is thus scattered across numerous documents that are often identified as inconsistent, inaccurate and/or out-of-date. Moreover, the multiple documents are time consuming to create and maintain and they do not allow for statistical analysis facilitating future process improvement.

BRIEF DESCRIPTION OF THE INVENTION

In an exemplary embodiment of the present invention, a method of processing project data includes (a) receiving customer specifications, (b) identifying an engine model based on the customer specifications, (c) storing package options based on the engine model identified in (b), (d) enabling a user to select the package options from the stored package options, and (e) generating selected reports based on the package options selected in (d).

In another exemplary embodiment of the invention, a system for processing project data including structure for carrying out the method of the invention is provided.

In still another exemplary embodiment of the invention, a system for processing project data includes a user interface for receiving customer specifications and identifying an engine model based on the customer specifications. The processor including a memory storing package options that are segregated based on the identified engine model enables a user to select the package options from the stored package options via the user interface. The processor generates selected reports based on the selected package options.

BRIEF DESCRIPTION OF THE DRAWINGS

FIG. 5 is a flow diagram for creating/modifying a budgetary analysis;
FIG. 6 is a flow diagram for tool maintenance;
FIG. 8 is a screen shot showing a user interface and package configuration;
FIG. 9 is a screen shot showing project information.

DETAILED DESCRIPTION OF THE INVENTION

Figure 1:
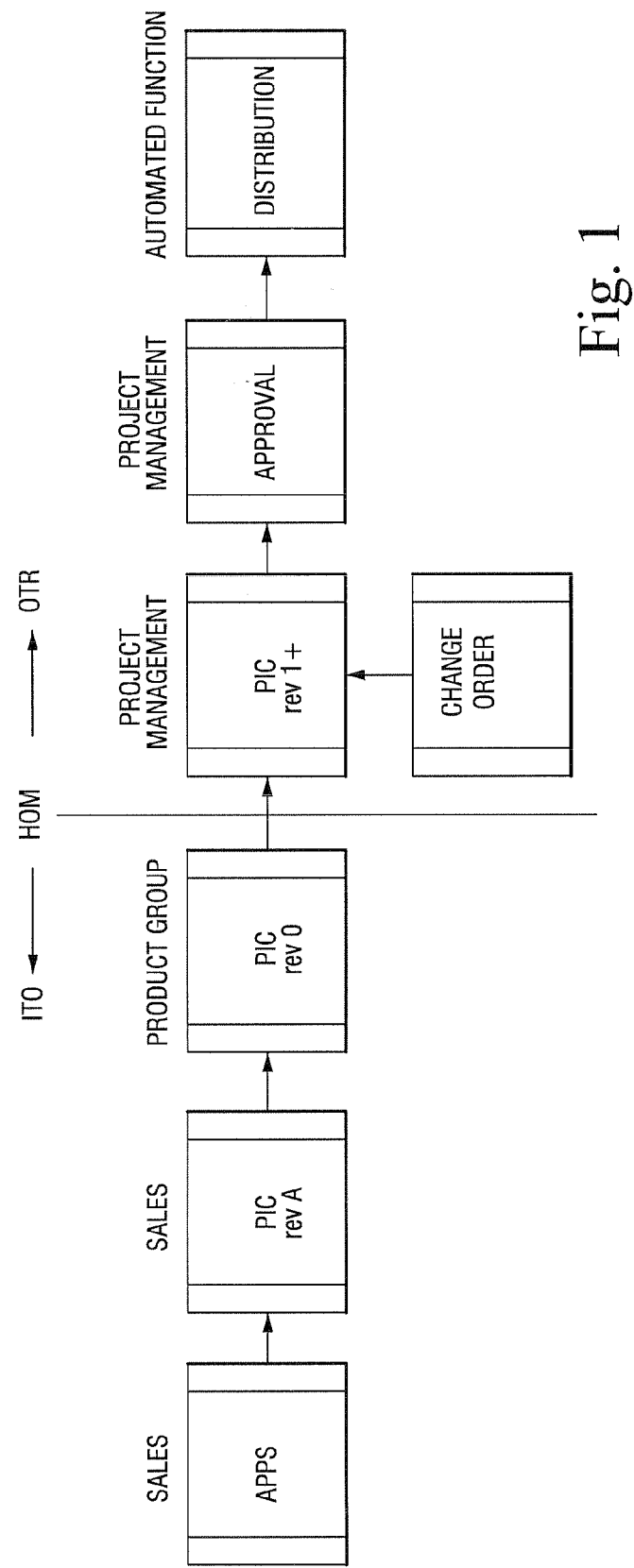
FIG. 1 is a business process flow diagram.

A database configuration in the present invention includes data tables that respectively store varying information for a particular project. The invention will be described in the context of a particular application for exemplary purposes, but the invention is not necessarily meant to be limited to the described application.

In the database, an engine table holds all of the different engines offered via the system to provide in a configuration package. In the engine table, an ID field orders the list of engine models on a pull-down menu, with the lowest number at the top of the list and with the remaining models following in ascending order. In an Engine Desc field, the name of each engine model is provided. The names are used for display in the pull-down menu and matched up with the engine key in the model table to determine which database is to be opened.

In a model table, all of the models associated with each of the engines are stored. In an EngineKey field, a list of engine types is provided. Each engine type is listed once for each model to which it is associated. In a Model Desc field, the names of each model offered for each engine type are provided. A second pull-down menu will only display the values in the model description field that are associated with the engine key field value that the user selects in the first pull-down menu. A Default field determines which database is initially loaded for each engine type. The field should also be checked if the engine type only has one model description associated with it.

There is a specific table for each of the engine models. This table holds all of the package options for the selected model with a nesting structure used to identify the applicable options based for user input. The table also contains information such as what validation logic applies to the option, whether the option is mandatory, whether the option is the default option, the associated key to that option, and a metric score.

In a package options table, a Text field contains a title of a main heading of a section down to the deepest level of configuration selection choices. A Level field determines the nesting order of the configuration choices and formats a corresponding display. A highest choice or title is given a level of one (1). The program then checks for and indents displays of all configuration choices with a level of two (2) rating. The database does a similar procedure with every new level encountered. It indents farther with each new level and returns to its original level of indentation when a configuration selection is reached with the level number equivalent to its own. Therefore, for example, all level twos are indented the same amount as with level threes and so on while remaining underneath their respective section. (See, for example, FIG. 8.) An Option field defines if the user has the ability to select the configuration choice. For titles or main sections, the field is left unselected. If the field is selected, then the user will have the ability to select or unselect the choice in the configuration section of the program. A Standard field is selected if that configuration choice is selected by default when the option becomes available through interaction. The user, however, maintains the ability to select another option on that same nest level. A MultiSelect field, if selected, for a nest level, allows the user to select multiple options in that nest level. If unselected, the user must choose one and only one option in the corresponding nest level. A Key field includes a keyword relating a configuration selection to the budget and drawing numbers. A Metric field includes a score attached to main selection criteria identifying the importance of the information. The greater score is reported for items that have a greater business impact when unknown or changed. The overall metric adds up to the scores of all sections that have been left blank or "to be determined."

In a configuration flag table, all potential keys for the package options are contained. The keys tie user selections to budgetary and drawing information for reporting purposes. In a Keyword field, a list of words that are used to associate the configuration selections with drawing numbers and budgetary costs is provided.

A budgetary cost table holds the information necessary to create the budget. This information includes budget section, line items, description, cost, required keys per line item, and whether or not the line item is part of the base package. A Section field defines which budget section the particular line item will fall under. A SectionID field identifies the order the line item will be placed inside the major section of the budget report. Each line item is given a one letter code and is displayed in the budget report in alphabetical order. A Description field contains the name of the budgetary unit used for pricing the different components of the package. A UnitCost field includes the price of each budgetary unit that is displayed and summed in the total cost on the budget report if the user has selected the option from the configuration section. Fields from Key 1-Key 10 include words used to specify which line item should be entered into the budget report. These words are the same as the key words attached to the configuration options. When a configuration has been selected, the associated keywords are compared to the ones in each key column to determine what cost line items are applicable to the user defined configuration. Up to ten keywords can be used to differentiate the different budgetary cost line items from one another. Only one keyword can be entered into each of the ten key columns. Multiple flag fields designated Flag 1-Flag 10 contain logic criteria associated with keywords in the Key 1-Key 10 columns. If the check box is checked, then the keyword in the key column of the same number as the flag must be true in order to select the particular line item. If the check box is unchecked, then the keyword in the associated column must be false or not present in the current configuration selections in order to select the particular line item.

A features and options table holds the information necessary to create a features and options document. This information includes the system, drawing numbers and associated keys per line item. A Section field defines which section of the features and option report the drawing will fall under. A DwgNumber field contains the drawing number, wherein when the keyword criteria is met, the drawing number in this field is inserted under the appropriate section. Similar to the budgetary cost table, the features and options table contains key fields including Key 1-Key 10 and flag fields including Flag 1-Flag 10.

Finally, a general information table contains all information regarding the package configuration information. A GenInfoID field contains a number that determines the order in which information will be saved in the data file. A Caption field contains a title next to the data entry field and identifies which piece of information should be entered in the appropriate area. A Desc field contains comments to the user by using a mouse-over on the particular line item (Tool Tip) as to the meaning of each caption or issues related to the caption. A Default field contains an initial value of the data field. Numeric data are given an initial value of 0, while text data are initially set to TBD (to be determined). A Section field includes a title of the tab in the general information section of the program. The caption and data entry field are located on the particular tab based on the value of the field. An Object field describes the nature of the data field. If simple text is to be entered, then the field is given a value of text. If a combo box is to be used to select the data to be entered, the field is given the value of combo. A FormUsed field identifies which main page or report, if any, the data entered into the field is to be displayed on. Finally, a MetricScore field contains a score attached to selectable information identifying the importance of the data. As noted above, a greater score is reported for items that are deemed more essential to the OTR process. Non-essential items are given a score of 0. The overall metric adds up the scores of all sections which have been left blank or to be determined. A higher score means more open issues are present at the time of the HOM.

In the exemplary embodiment of the present invention, the performance program contains certain data elements that the application stores and utilizes in the project information and the configuration sections. A sales department completes the remainder of the project information and configuration to the best of their ability. Applications reviews the configuration and project information for accuracy and level of completion and is responsible for completing the budgetary analysis. Project management maintains the project information and configuration through the project execution phase, and engineering maintains the features and options lists and utilizes the program to identify scope changes.

Figure 2:
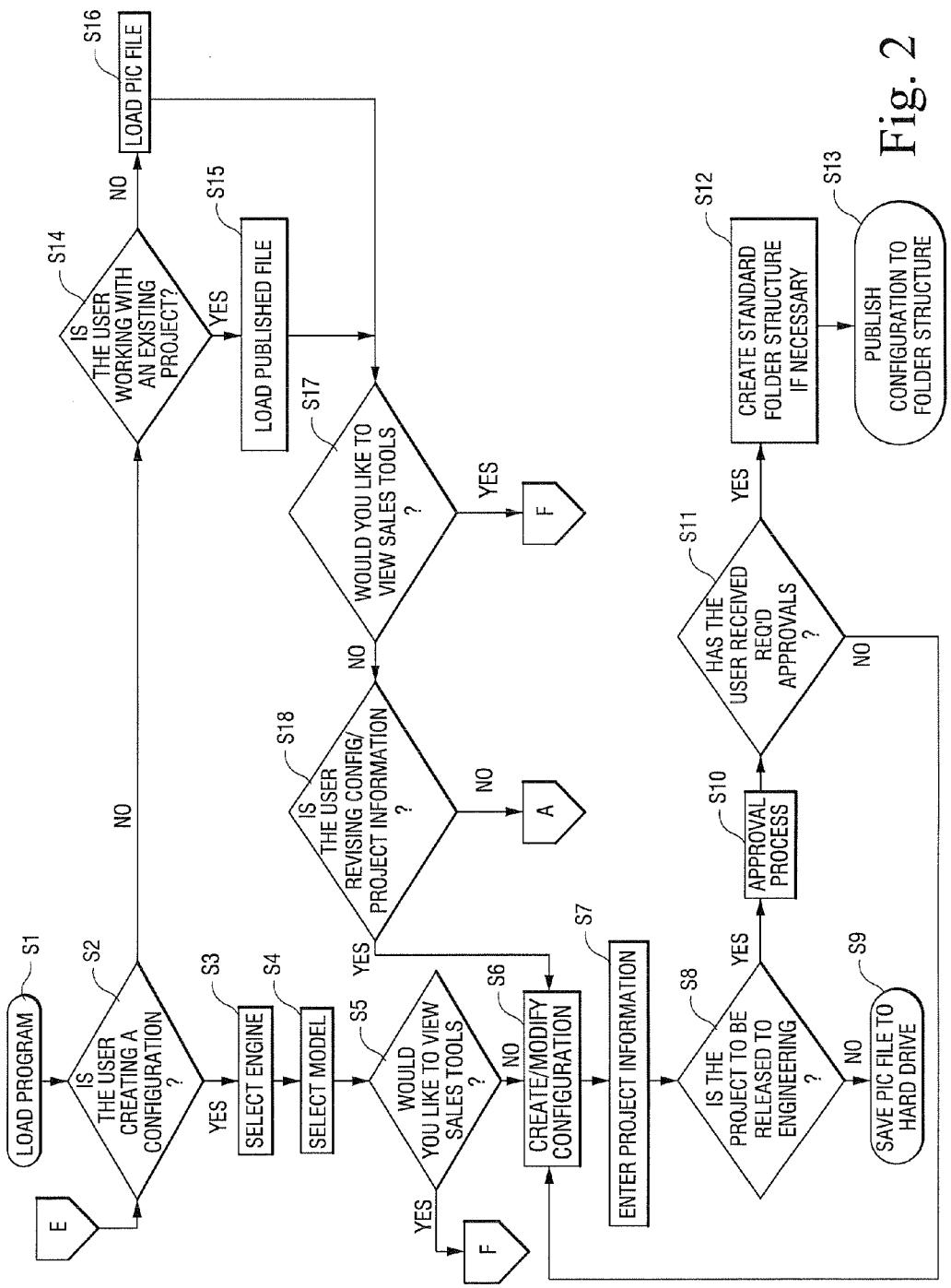
FIG. 2 is a flow diagram of the general process of the present invention.
Figure 8:
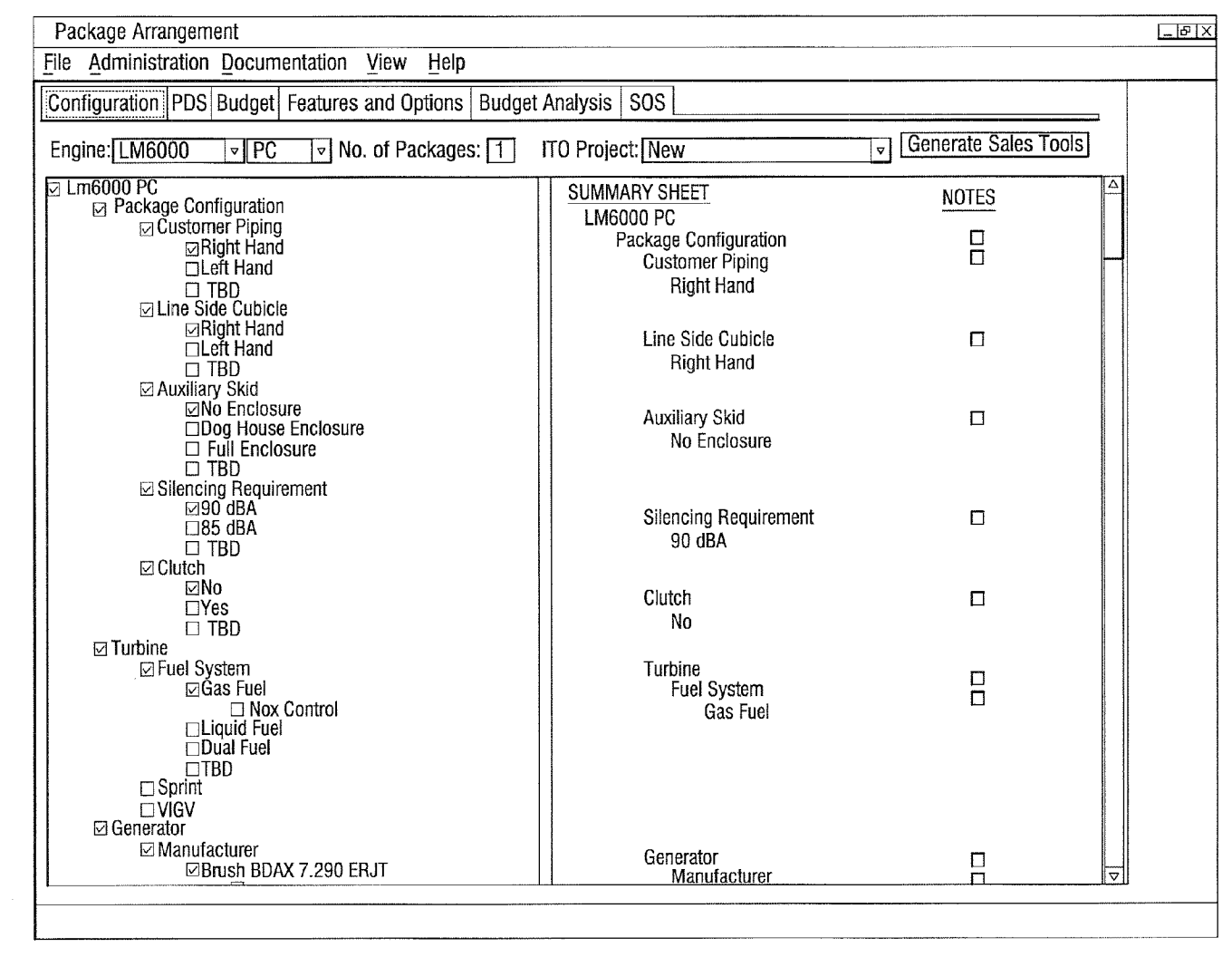

The system and process of the present invention will be described with reference to the flow charts of FIGS. 2-7 as well as the screen shots of FIGS. 8 and 9. With particular reference to FIG. 2, the program is first loaded in step S1, and the system determines whether the user is creating a new configuration (step S2). If so (YES in step S2), the user is prompted to select an engine based on the customer provided specifications (step S3). Once selected, the program reads the default model configuration table for the selected engine (step S4). Using a recursive function, the application identifies the structure of the options. In other words, the application identifies what options are dependent on or nested under higher level options and creates a treeview graphical user interface (GUI). A screen shot with the configuration table and selectable options is shown in FIG. 8.

Prior to creating and/or modifying a configuration (step S6), the system queries whether the user would like to view sales tools in step S5. If so (YES in step S5), the system carries out the process shown in the flow diagram of FIG. 7, which will be described in detail below.

As the user selects options applicable to the project in step S6, the application automatically identifies and deselects all conflicting information. Additionally, the system identifies what options have been selected and locates the associated Boolean operator (found in the Boolean table). The appropriate Boolean operator is then set to true. Conversely, the application also identifies what options have been deselected and sets those indices to false. These Boolean operators are later utilized to analyze the budget and features and options lists for data reports. Additionally, the system identifies the treeview structure and displays applicable options in the treeview based on the user's selected options and closes all nest levels that are no longer available.

The project information is entered in step S7, and when complete, the system queries whether the project is to be released to engineering (step S8). If not (NO in step S8), a "PIC" file is stored in a hard drive or other data storage device (step S9). If the project is for release to engineering (YES in step S8), the system initiates the approval process (step S10) and subsequently determines whether the user has received all required approvals (step S11). If so (YES in step S11), a standard folder structure is created in step S12, and the configuration is published to the folder structure in step S13. If the necessary approvals have not been received (NO in step S11), the process returns to step S6 for further data entry or revision of project information.

Figure 10:
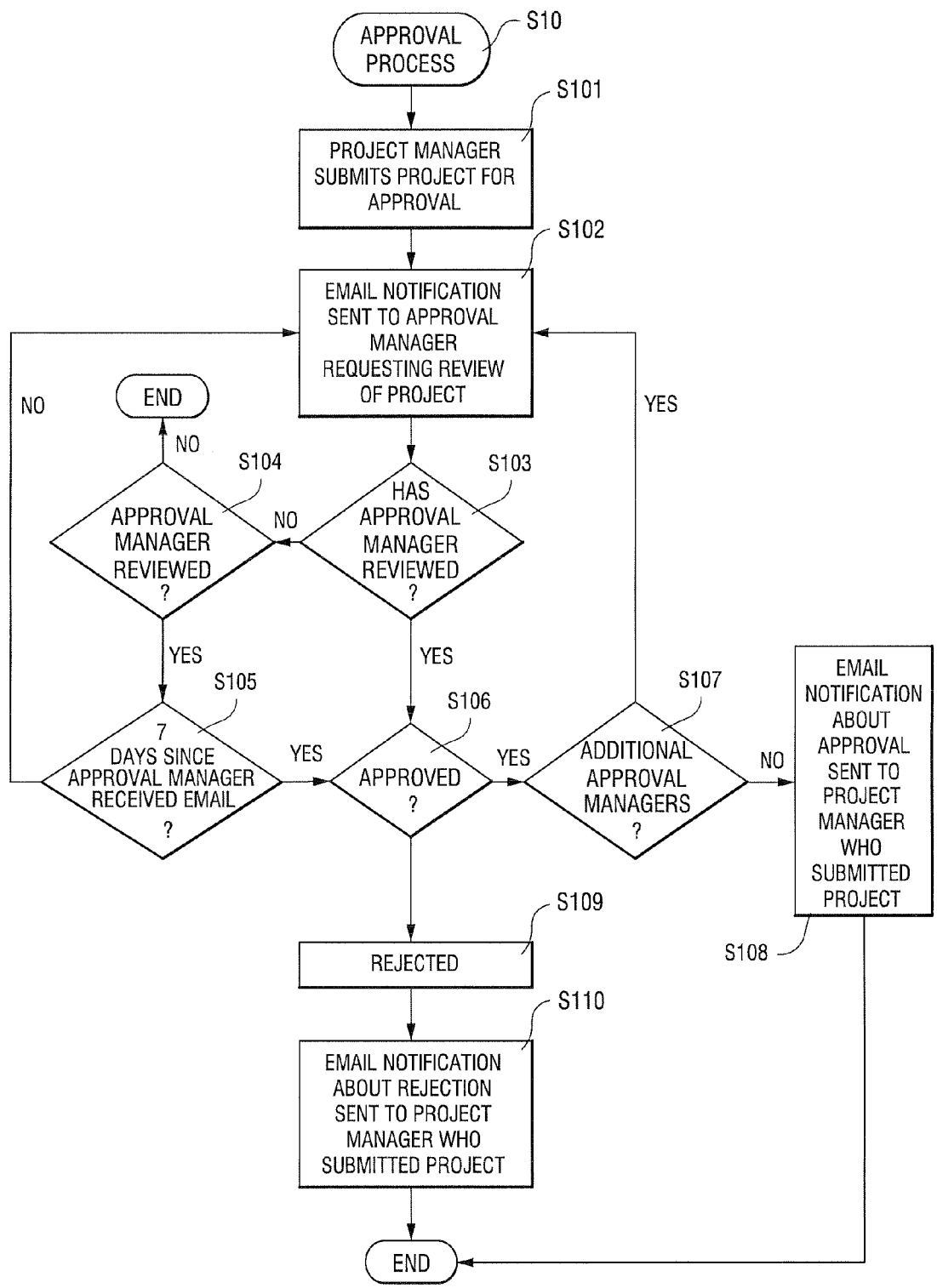
FIG. 10 is a flow diagram showing an approval process.

The approval process (step S10) will be further described with reference to FIG. 10. In step S101, a project manager submits the project for approval. An e-mail notification is sent to an approval manager requesting review of the project (step S102). If the approval manager has not reviewed the project (NO in step S103), the system determines whether forty-eight (48) hours has passed since the approval manager received the e-mail notification (step S104). If not, the system allows additional time to pass for manager approval. If so (YES in step S104), the system determines whether seven (7) days have passed since the approval manager received the initial e-mail (step S105), and if not, the e-mail notification is resent (step S102). In step S106, the system determines whether the project has been approved (step S106) and whether additional approval managers are required to review the project (step S107) If no further approval managers are required to review the project (NO in step S107), an e-mail notification is sent in step S108 to the project manager who submitted the project indicating project approval.

If the project is not approved (NO in step S106), the project is thus rejected (step S109), and an e-mail notification is sent to the project manager who submitted the project of the project's rejection (step S110).

The user has the ability to save the project configuration, notes, general information, budgetary analysis, SOS line items, features and options list, and all open items based on what information the user has selected/entered with a metric score associated with each open item. The user can choose between publishing the data to a business server or saving locally to the computer hard drive. Publishing a file signifies an official release to the business for review/approval. Each time a package is published, a separate line item is created in the standard folder structure on a hidden server. This gives the application the ability to track changes and analyze those changes for business impact and statistical analysis. The PIC file stores the package information locally without releasing it to the business.

If the user is not creating a new configuration (NO in step S2), the system queries whether the user is working with an existing published project in step S14, and if so (YES in step S14), the published file is loaded in step S15. If not (NO in step S14), the PIC file is loaded in step S16.

Like step S5, the system queries whether the user would like to view sales tools in step S17, and if not (NO in step S17), the system queries whether the user is revising the configuration and/or project information in step S18. If so (YES in step S18), the system proceeds to step S6. If not (NO in step S18), the system proceeds to the process flow illustrated in FIG. 3.

Figure 3:
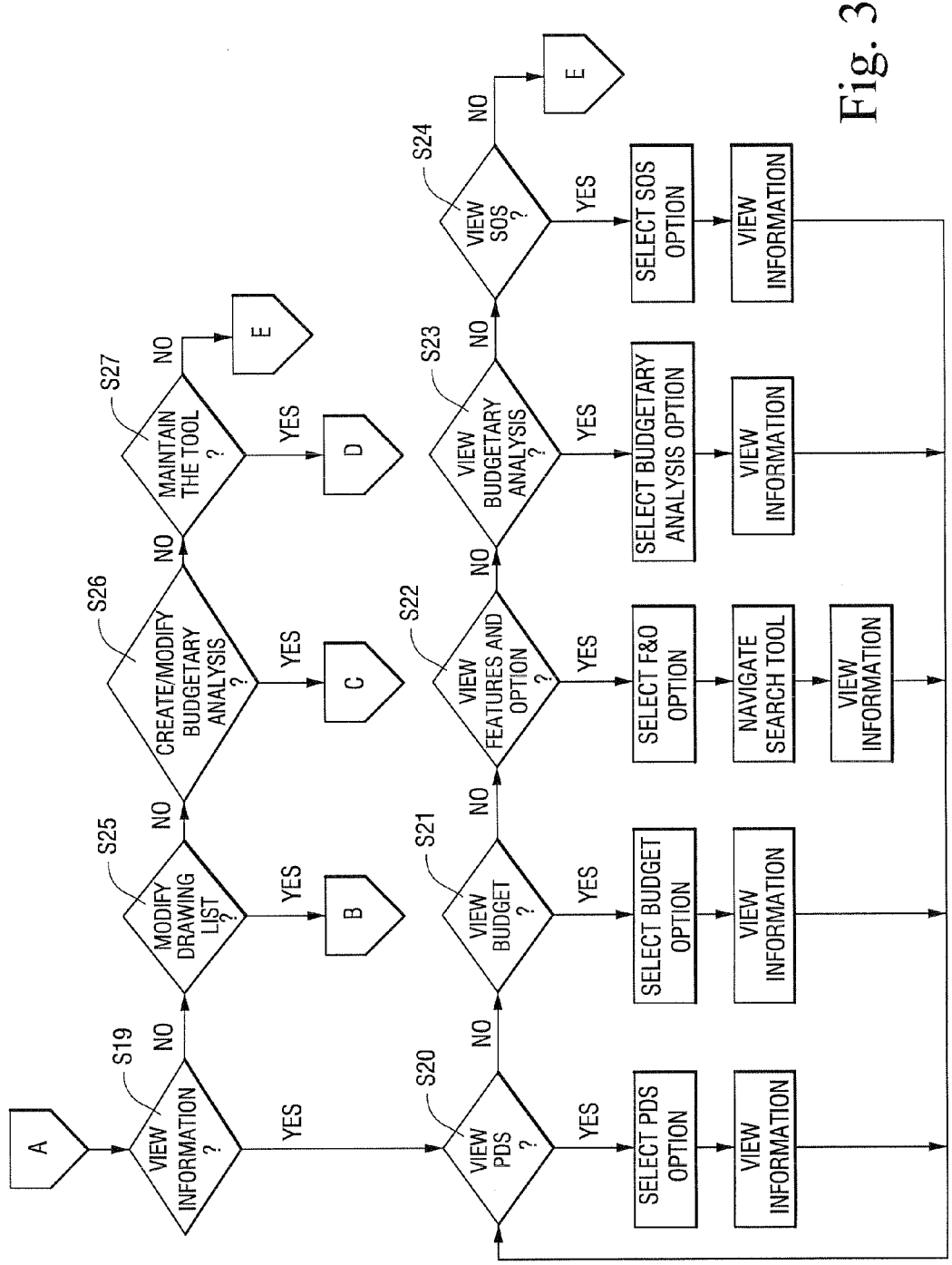
FIG. 3 is a flow diagram showing the process for revising the configuration/project information.

With reference to FIG. 3, in step S19, the system queries whether the user would like to view information concerning the project configuration. If so (YES in step S19), the user is provided options to view PDS (S20), budget (S21), features and options (S22), budgetary analysis (S23), or SOS (S24). Selection and viewing of the respective reports may be limited by the user's permissions. A screen shot illustrating an exemplary report is shown in FIG. 9. In these displays, information is never manipulated or added, which forces the user to enter any necessary change in the configuration or project information sections.

In the PDS information view (step S20), the application references the information found in the general information table. If the information is defined to be available with the user selected report (the PDS in this case), the user input corresponding with the field is included in the report. The configuration selected by the user is then displayed in the report. Any applicable notes are also presented. Notes are used to identify and describe any non-standard information regarding the customer specific package. In other words, any customer requests outside the typical scope of supplies.

In the budget information view (step S21), the application references the information found in the general information table. If the information is defined to be available with the user selected report (the budget in this case), the user input corresponding with the field is included in the report. The application references the information found in the budget table. Each line item in the table is analyzed against the Boolean values (i.e., the configuration). If the keys and flags match the Boolean values found in the configuration, then the line item is added to the report. All notes and their associated costs are then displayed in a special request section. Each budgetary line item has specific customer options associated with it. These options are often complex, for instance: if given five options a, b, c, d and e, the budgetary line item may require (1) the user to select option a, c and d, (2) the user not to select b, and (3) not be affected one way or the other by e.

In this case, the database would show the key associated with option a (found in the package options table) with a TRUE flag field.

In the features and options list (step S22), the application references the information found in the features and options table. If the information is defined to be available with the user selected report, the user input corresponding with the field is included in the report. The application references the information found in the features and options table. Each line item in the table is analyzed against the Boolean values (i.e., the configuration). If the keys and flags match the Boolean values found in the configuration, then the line item is added to the report.

In the budgetary analysis view (step S23), the application creates a budget and pulls the line items into the budgetary analysis format. Text boxes are supplied for the user to input actual cost per line item. The application then calculates variance between the package's actual cost and initial estimated cost.

In the SOS information view (step S24), the application references the information found in the general information table. If the information is defined to be available with the user selected report, the user input corresponding with the field is included in the report. The application then reviews all of the packages associated to the current project and reports all SOS line items.

If the user does not desire to view information (NO in step S19), the user is provided with options to modify the drawing list (step S25), create and/or modify the budgetary analysis (step S26), or maintain the tool (step S27). The selected processes in steps S25, S26 and S27 are shown in the flow charts of FIGS. 4, 5 and 6, respectively.

Figure 4:
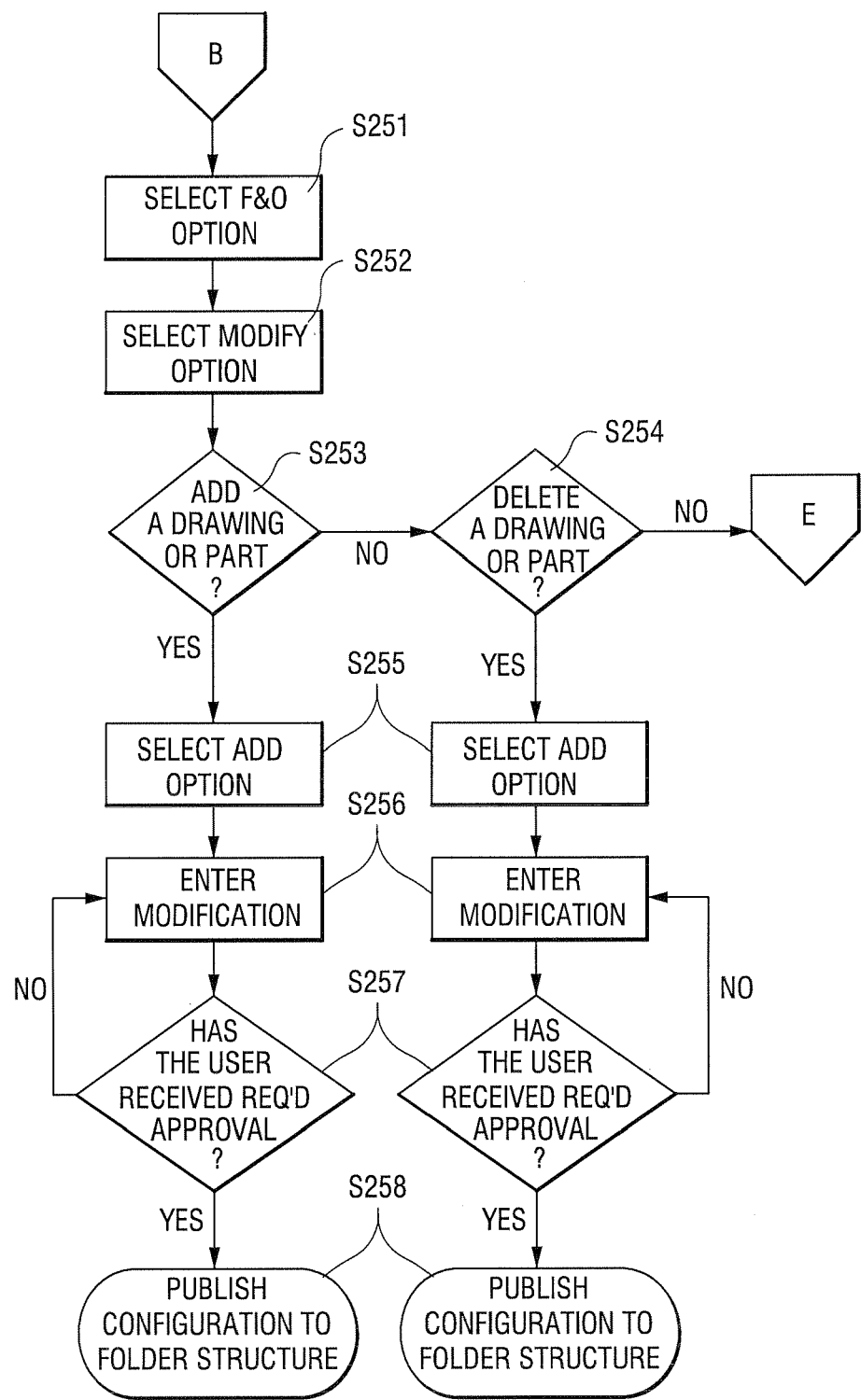
FIG. 4 is a flow diagram for modifying the drawing list.

If the user intends to modify the drawing list (YES in step S25), with reference to FIG. 4, the system selects the features and options list option (step S251) and subsequently selects a modify option (step S252). The system then queries whether the user intends to add a drawing or part (step S253), delete a drawing or part (step S254) or return to the configuration (NO in step S254). In either instance (YES in either step S253 or step S254), the add option is selected (step S255) and the modification is entered (step S256). Various levels of approval may be required for such modifications, and the system determines whether any required approval has been received in step S257. If not (NO in step S257), the system returns to step S256 for further modification. If so (YES in step S257), the modified configuration is published to the folder structure in step S258.

With reference to FIG. 5, if the user desires to create and/or modify the budgetary analysis (YES in step S26), the system selects the budgetary analysis option in step S261, selects the modify option in step S262, and enables the user to enter the modification in step S263. The system queries whether the user has received any required approval in step S264, and if so (YES in step S264), the modification is published to the folder structure in step S265. If any required approval has not been received (NO in step S264), the system returns to step S263 for further modification entry.

If the user desires to maintain the tool (YES in step S27), with reference to FIG. 6, the system performs tool maintenance in step S271 and subsequently returns the process to the configuration section. In the maintenance process, the database can be modified or manipulated in any fashion. Due to the structure of the application, the results will range from modifying reports to adding package options or even an entire package.

With respect to effecting changes in the configuration, fields are supplied to allow the user to create a document used to track contractual or scope changes defined through the life of the project. This view also allows the user to load previous change orders that apply to the loaded package.

Figure 7:
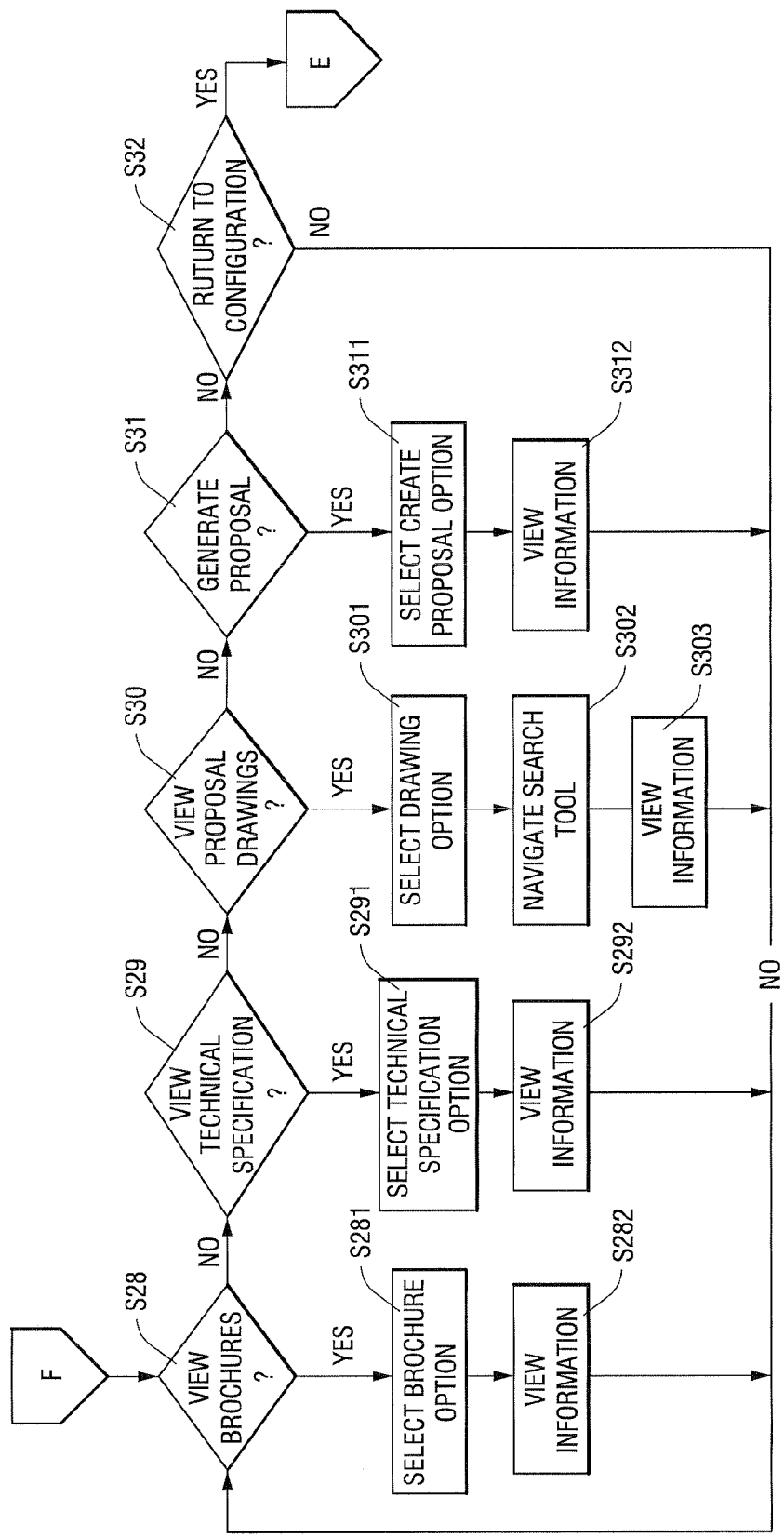
FIG. 7 is a flow diagram for viewing sales tools.

The process flow for viewing sales tools will be described with reference to FIG. 7. In this process, the user is provided with options to view brochures (step S28), view technical specifications (step S29), view proposal drawings (step S30), generate a proposal (step S31), or return to the configuration (step S32). In the brochure view process (YES in step S28), the user is prompted to select the brochure option (step S281), and the information is displayed (step S282). A similar process is carried out with respect to technical specifications (YES in step S29) in steps S291 and S292 and generate proposal (YES in step S31) in steps S311 and S312. Similar to budget and features and options, the technical specification is generated dynamically. This document describes the package specific information based on what the user has selected/inputted.

In viewing the proposal drawings (YES in step S30), the user selects the drawing option in step S301, a search tool is navigated in step S302, and the information is displayed in step S303. Several different drawings may be available based on the selected engine/model. The user must select which drawing to view.

The program is responsible for producing the production data sheet (PDS), the budget, the features and options list (F&O), the budgetary analysis, and the sales order summary (SOS). In addition, the program must have the capability of producing the metric data as discussed above. The PDS contains information that is required for engineering to order parts and manufacturing to build the package. This information includes items such as customer information, site conditions, testing information, among other information as defined in the general information table. In addition to the package information, the PDS also contains the entire project scope.

The budget provides the item costs as defined in the budget cost table and the package information (required items are defined in the general information table). The budget document then sums the item costs into a section total (again, this information is included in the budget cost table). The total package cost is then calculated by summing up each of the section totals. The features and options list is created by listing each of the drawings, as defined in the features and options table, that apply to the identified package configuration. The list is organized into sections that are also defined in the table. The budgetary analysis reads the information from the initial budget, allows the user the ability to enter actual costs associated with each line item, calculates a variance per line item, allows the user to enter a description of the variance, and then summarizes the variance. The summary separates the line items into one of two categories. The base packaging is defined as necessary items for a GTG package. These items are identified in the budget cost table. The remaining items are categorized as standard options.

Generally, the program is designed to have the functionality of maintaining project information and configuration from the ITO process to the project completion. Furthermore, the program formats this information appropriately to provide the business with the required documentation and information. Specifically, as noted above, the program is required to create the budget, PDS, F&O (including production releases, customer transmittals, and required dates), the SOS and a budgetary analysis document. In addition to the listed functions, the program tracks the project using the ITO metrics on quality. The metrics include open items, specific revisions that were made, the personnel that made the revisions, when the revisions were made, and why.

The system of the present invention provides the ability to automate, direct and monitor a project development through business processes. The system effects streamlined project documentation, comprehensive single source data entry and stores historical data while maintaining current and up-to-date information, including project information and documentation, package availability and options, budgetary information, base offerings, and features and options lists. Through direct electronic routing, automated approval processes for modifications and/or base configurations can be obtained. A running project budget can be maintained enabling budgetary analysis capabilities. The system maintains and generates reports on change order descriptions, magnitude of change calculations, metric data, open items, administration capabilities and project information location/structure. The system enables automatic updating for the database as well as for executable operations. Still further, the system accommodates multiple points of data entry and processes data using standard document formats.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of processing manufacturing project data for a product to be manufactured, the method comprising:
    (a) receiving customer specifications for the product;
    (b) identifying a product model based on the customer specifications;
    (c) storing manufacturing package options based on the product model identified in (b);
    (d) enabling a user to select the manufacturing package options from the stored package options, wherein step (d) comprises enabling the user to update/modify the selected package options, and storing historical project data identifying updated/modified information including a particular user, date and time of update/modification; and
    (e) automatically generating, by a computer, selected reports based on the package options selected in (d), the reports being for use prior to manufacturing the product to define a manufacturing process, at least one of the selected reports identifying open items required before releasing the manufacturing project data to commence the manufacturing process.

2. A method according to claim 1, wherein step (e) is practiced by generating a budget report based on the package options selected in (d).

3. A method according to claim 2, wherein step (e) is further practiced by storing line item cost estimates for each component in the product model and enabling a comparison with actual costs.

4. A method according to claim 1, wherein step (c) is practiced by storing package options with a nesting structure.

5. A method according to claim 1, wherein step (e) is practiced by generating a features and options report based on the package options selected in (d), the features and options report including a list of figures available based on the product model and the selected package options.

6. A method according to claim 1, wherein step (e) is practiced by generating a sales order summary report based on the package options selected in (d), the sales order summary report including a summary of all equipment sold.

7. A method according to claim 1, wherein step (d) comprises storing the selected package options locally or publishing the selected package options for global use.

8. A method of processing project data comprising:
    (a) receiving customer specifications;
    (b) identifying an engine model based on the customer specifications;
    (c) storing package options based on the engine model identified in (b);
    (d) enabling a user to select the package options from the stored package options; and
    (e) automatically generating, by a computer, selected reports based on the package options selected in (d),
    wherein step (e) comprises enabling at least one approval manager to review items requiring approval, and wherein if multiple approvals are required for one or more items, the method comprising automatically successively routing a report including the items requiring approval to each approval manager.

* * * * *